United States Patent
Irie (10) Patent No.: US 9,579,582 B2
(45) Date of Patent: Feb. 28, 2017

(54) TOY FLUTE

(71) Applicant: SANKYO RIKEN CORPORATION, Tokyo (JP)

(72) Inventor: Makoto Irie, Tokyo (JP)

(73) Assignee: SANKYO RIKEN CORPORATION, Tokyo (JP)

( * ) Notice: Subject to any disclaimer, the term of this patent is extended or adjusted under 35 U.S.C. 154(b) by 0 days.

(21) Appl. No.: 14/900,905

(22) PCT Filed: Sep. 27, 2012

(86) PCT No.: PCT/JP2012/075733
§ 371 (c)(1),
(2) Date: Mar. 4, 2016

(87) PCT Pub. No.: WO2013/047894
PCT Pub. Date: Apr. 4, 2013

(65) Prior Publication Data
US 2016/0236107 A1   Aug. 18, 2016

(30) Foreign Application Priority Data

Sep. 27, 2011   (JP) ................. 2011-227360
Sep. 20, 2012   (JP) ................. 2012-224545

(51) Int. Cl.
*A63H 3/26*   (2006.01)
*A63H 5/00*   (2006.01)
(Continued)

(52) U.S. Cl.
CPC ............. *A63H 5/00* (2013.01); *A01K 15/025* (2013.01); *A63H 3/003* (2013.01); *A63H 3/06* (2013.01);
(Continued)

(58) Field of Classification Search
CPC .............. A63H 3/28; A63H 3/31; A63H 5/00
See application file for complete search history.

(56) References Cited

U.S. PATENT DOCUMENTS 1,187,838 A * 6/1916 Hughes .................. A63B 43/00
446/188
1,515,477 A * 11/1924 Grubman ................. A63H 3/31
446/196
(Continued)

FOREIGN PATENT DOCUMENTS

JP    1992-111394 U    9/1992
JP    H05-000194 U     1/1993
(Continued)

OTHER PUBLICATIONS

Written Opinion of the International Searching Authority (PCT/JP2012/075733).

*Primary Examiner* — John Ricci
(74) *Attorney, Agent, or Firm* — Konomi Takeshita (57) ABSTRACT

The toy flute is configured such that: a reciprocating body is accommodated inside a cylindrical body in a reciprocating manner; the cylindrical body is installed at an inner side of an opening section provided at a hollow body in such a manner that a vent hole at one side from among two vent holes provided at the abovementioned cylindrical body can communicate with the abovementioned opening section; and a flute section is installed at the abovementioned cylindrical body in such a manner that airflow flowing between the abovementioned opening section and a vent hole at the other side from among the abovementioned two vent holes causes sound to occur and reverberate inside the cylindrical body.

15 Claims, 4 Drawing Sheets

(51) Int. Cl.
    *A63H 3/28*    (2006.01)
    *A63H 3/31*    (2006.01)
    *A63H 33/18*   (2006.01)
    *A01K 15/02*   (2006.01)
    *A63H 3/00*    (2006.01)
    *A63H 3/06*    (2006.01)

(52) U.S. Cl.
    CPC .............. *A63H 3/28* (2013.01); *A63H 3/31* (2013.01); *A63H 33/18* (2013.01)

(56) References Cited

U.S. PATENT DOCUMENTS

| | | | | |
|---|---|---|---|---|
| 1,588,356 A | * | 6/1926 | Grubman | ............... A63H 3/28 446/196 |
| 1,642,956 A | * | 9/1927 | Hutnikow | ............... A63H 3/28 446/196 |
| 2,302,318 A | * | 11/1942 | Henry | ............... A63H 5/00 446/196 |
| 5,533,757 A | * | 7/1996 | Morris | ............... A63H 5/00 281/15.1 |
| 6,123,599 A | * | 9/2000 | Chiang | ............... A63H 5/00 446/196 |
| 6,609,944 B1 | | 8/2003 | Viola | |
| 7,066,779 B2 | | 6/2006 | Willinger | |
| 7,950,352 B2 | | 5/2011 | Specht | |

FOREIGN PATENT DOCUMENTS

| | | |
|---|---|---|
| JP | 1993-41590 U | 6/1993 |
| JP | H06-034660 U | 5/1994 |
| JP | 3002155 U | 6/1994 |
| JP | 3004028 U | 8/1994 |
| JP | 8-38745 A | 2/1996 |

\* cited by examiner

TOY FLUTE

CROSS REFERENCE TO RELATED APPLICATIONS

This application claims priority under 35 U.S.C. 119 and 35 U.S.C. 365 based upon Japanese Patent Application No. 2011-227360, filed on Sep. 27, 2011 and upon Japanese Patent Application No. 2012-224545, filed on Sep. 20, 2012. The entire disclosure of the aforesaid applications are incorporated herein by reference.

FIELD OF THE INVENTION

The present invention relates to a toy flute in which a flute is installed at a hollow body such as a ball and which is configured such that the flute makes sound when the hollow body is played with.

BACKGROUND OF THE INVENTION

There are various kinds of flutes including one in which a piston-like cylindrical flute is provided inside a cylindrical container in a reciprocating manner and sound can be made by airflow passing through the cylindrical flute as the flute reciprocates. In order to allow a cylindrical flute to reciprocate, there are a cattle flute in which a weight is provided at the cylindrical flute and a so-called croaking flute in which a coil-shaped spring is installed in between the cylindrical flute and a container.

The toy provided with a whistling flute in a ball includes a "sounding throwing toy" disclosed in Japanese Utility Model Application Kokai Publication No. H06-034660 and an "imitation sound generating device and toy" disclosed in Japanese Utility Model Application Kokai Publication No. H05-000194. In Japanese Utility Model Application Kokai Publication No. H06-034660, a whistling flute (sounding body 2) is placed at the center of a spherical body 6 disposed inside a stuffed toy, wherein particularly the sounding body 2 placed at the center of the spherical body 6 has a weight that can be restored in the gravitational lower direction at all times and air inside the sounding body flows out as a result of a change in the weight thus restored to cause a flute body to make sound. Similarly, in Japanese Utility Model Application Kokai Publication No. H05-000194, an imitation sound generating member 20 is rotatably installed at a frame body 15, which is rotatably provided at a central section of a spherical body, wherein this toy is configured such that a weight 25 of this imitation sound generating member 20 can be restored in the gravitational lower direction.

PRIOR ART DOCUMENTS

Patent Documents

Patent Document 1: Japanese Utility Model Application Kokai Publication No. H06-034660
Patent Document 2: Japanese Utility Model Application Kokai Publication No. H05-000194

SUMMARY OF THE INVENTION

In both Japanese Utility Model Application Kokai Publication No. H06-034660 and Japanese Utility Model Application Kokai Publication No. H05-000194, the configuration is such that a flute is disposed at the center of a spherical body and a weight of the flute can be restored in the gravitational lower direction at all times based on a combination of two axes. It is believed that the reason why the flute is provided at the center of the spherical body is that the gravitational restoration of the posture of the flute by the weight is regarded as important.

However, the problem of this configuration is that a formation such as a combination of two axes is so complicated that such a toy cannot be manufactured with ease and the production cost tends to become high. Moreover, since the flute is disposed at the center of a spherical body, the sound of the flute is shut out by the spherical body and is liable to be muffled so that only a small sound can be heard. Furthermore, since the problem to be solved by both inventions is the quality of sound at the time of throwing such a toy, sound at the time of play other than throwing (e.g., subtle sound made by the adjustment of gripping a spherical body with fingers, the swinging of the body, etc.) is not regarded as important.

Accordingly, the present invention is to solve the abovementioned problems by providing a toy flute that is new as never before and can be manufactured with ease and at low cost, wherein the sound of the flute is not muffled but can be heard clearly and the sound is provided whenever the toy flute is thrown or played with.

In the invention according to claim 1, the abovementioned problems can be solved with a flute toy, wherein a reciprocating body is accommodated inside a cylindrical body in a reciprocating manner; the cylindrical body is installed at an inner side of an opening section provided in a hollow body in such a manner that a vent hole at one side from among two vent holes provided at the abovementioned cylindrical section can communicate with the abovementioned opening section; and a flute section is installed at the abovementioned cylindrical section in such a manner that airflow flowing between the abovementioned opening section and a vent hole at the other side from among the abovementioned two vent holes causes sound to occur and reverberate inside the cylindrical section. The hollow body is compressed when it is held by hand, so that when air inside the hollow body comes through the vent hole at the other side of the abovementioned cylindrical section, passes through the vent hole at one side of the same and then leaves through the abovementioned opening section of the hollow body, airflow occurs at the abovementioned flute section as well, with the result that sound occurs at the flute section. Moreover, sound also occurs at the flute section by compressing the hollow body (e.g., when a thrown ball drops on the floor or a ball is caught by another person at the time of playing catch). In the case that the hollow body is provided with elasticity, sound occurs at the flute section at a time when air outside the hollow body comes into the hollow body from the opening section as a result of rebound from the abovementioned compression. At the time of the compression or rebound of the hollow body, a reverberation space inside the cylindrical section becomes large or small because the reciprocating body reciprocates inside the cylindrical section. A sound generated at the abovementioned flute section enters this reverberation space and creates variegated sounds.

The abovementioned hollow body is preferably a ball and is provided with elasticity, and it can be provided as a toy for a child, a pet or the like. If the ball is used by a person for play, the flute makes sound when it is gripped by hand or kicked by foot. If the ball is for a pet, the flute makes sound when the pet pushes and rolls the ball with its muzzle or bites the ball with its mouth. Thus, this invention is a toy flute suitable for an owner and a pet to play together. However, the external form is not limited to a spherical body but may be a figurative body such as an animal or may be covered with a stuffed toy made of cloth. It may appear to be a stuffed toy externally, but the flute makes sound when a person holds it, hugs it, or hands it over to another person. The flute section can be configured such that the sound of the flute is as if someone were chatting. At a region of the abovementioned flute section facing the abovementioned cylindrical section in the reciprocating direction, a cushion may be provided in such a manner that airflow cannot be prevented. The reciprocating body hits the cylindrical section at the time of reciprocating movement and might possibly generate a hitting sound depending on the material quality of the cylindrical section and reciprocating body. If it is undesirable, some kind of a cushion may be placed between the cylindrical section and the reciprocating body. As a cushion, paper, a sponge, a rubber plate or the like may optionally be used. In the invention according to claim 2, as described below, the configuration is such that the reciprocating body reciprocates via an elastic body, but a cushion may be used if there is a problem that the reciprocating body hits the cylindrical section. What is described in this paragraph can be applied to the invention according to claim 2 below as well.

Furthermore, in the invention according to claim 2, the abovementioned problems can be solved with a flute toy, wherein a reciprocating body is accommodated inside a cylindrical body in a reciprocating manner via an elastic body; the cylindrical body is installed at an inner side of an opening section provided in a hollow body in such a manner that a vent hole at one side from among two vent holes provided at the cylindrical section can communicate with the opening section; and a flute section is installed at the cylindrical section in such a manner that airflow flowing between the opening section and a vent hole at the other side from among the two vent holes causes sound to occur and reverberate inside the cylindrical section. Since the reciprocating body is accommodated inside the cylindrical section via an elastic body, the reciprocating body can easily be moved even with slight vibration. Accordingly, the reciprocating body can be vibrated while the hollow body is flying in the air or even with slight movement of the body while holding the toy with hand, and therefore subtle changes can be given to the sound of the flute.

The abovementioned elastic body may have any optional constitution including a leaf spring, a rubber string and a magnet that makes use of repulsion, but a coil spring is relatively preferable (the invention according to claim 3). While the reciprocating body has its own small weight, it is possible to allow the flute section to make a different sound by providing another weight (though the toy becomes heavier with this weight as compared with one less heavy without this weight). However, this weight is not to control the posture of the flute section as in the case of the prior art but to give changes to the vibration of the elastic body.

Next, the invention according to claim 4 provides the toy flute according to claim 1 or 2, wherein the abovementioned flute section is provided at the abovementioned reciprocating body. Airflow occurs in the reciprocating direction of the reciprocating body as the reciprocating body reciprocates in a manner as described above. This airflow allows the flute section provided at the reciprocating body to make sound. Particularly, a toy accommodating the reciprocating body inside the cylindrical section via an elastic body as in the case of the invention according to claim 2 allows the flute to make sound even with very small vibration. The sound generated at the flute section passes through a reverberation space that becomes large or small as the reciprocating body reciprocates inside the cylindrical section.

Next, the invention according to claim 5 provides the toy flute according to claim 1 or 2, wherein the abovementioned flute section is provided at the abovementioned vent hole on the other side. The vent hole on the other side is as described below. In other words, when a vent hole opened at the top section of the cylindrical section is referred to as a vent hole on one side, a vent hole on the other side may be opened at the bottom section of the cylindrical section or opened at the side wall of the cylindrical section, for example. The flute section may be provided at an inner section of the cylindrical section or an outer section of the cylindrical section in such a manner as to communicate with the vent hole on the other side. In this flute section, airflow flowing between the abovementioned opening section and the vent hole on the other side causes sound to occur and reverberate inside the abovementioned cylindrical section.

Next, the invention according to claim 6 is the toy flute according to claim 1 or 2, wherein: the hollow body is a doll; a tongue opening section is provided at a region corresponding to the mouth of the doll and the reciprocating body is provided with a tongue-like body; and the tongue-like body is provided in such a manner as to reciprocate in the vicinity of the tongue opening section as the reciprocating body reciprocates. As described above, when the hollow body is compressed by hand, air inside the hollow body moves the reciprocating body inside the cylindrical section, which is disposed at an inner side of the opening section, and flows out of the hollow body through the opening section. On the other hand, when rebound occurs from the abovementioned compression, air outside the hollow body flows into the hollow body through the opening section to move the reciprocating body. This causes the reciprocating body to reciprocate, which is in turn expressed as the reciprocating movement of the tongue-like body provided at the reciprocating body. Accordingly, when the doll is compressed by hand, the tongue-like body moves in such a manner as to go out of the abovementioned tongue opening section of the doll (i.e., hollow body) in the outward direction, and when the hollow body is provided with an elastic body, the tongue-like body moves in such a manner as to retreat from the tongue opening section in the inward direction when hand power is relaxed. A player can enjoy such movement together with the sound made by the flute section. The design may be such that the abovementioned tongue opening section and the abovementioned opening are the same.

In this invention, the combination of the abovementioned opening section and the abovementioned flute section may be provided at a plurality of places inside the abovementioned hollow body. The opening section through which air inside the hollow body flows is not limited to one place. Accordingly, the configuration may be such that whistling flutes having different tones are provided at two openings, for example. Moreover, in this invention, the abovementioned cylindrical section may be provided approximately at the length of the diameter of the abovementioned hollow body, so that the abovementioned reciprocating body can reciprocate approximately for the diameter of the abovementioned hollow body. As a result, it is possible to keep a reverberation space as large as possible. Accordingly, the tone and the way of whistling dramatically change at the flute section, which uses this reverberation space. It might be referred to as "interesting whistling or sound" as general sensibility.

Effect of the Invention

According to this invention, there is no need to provide a means for restoring a weight of a flute in the gravitational lower direction at all times as in the case of conventional examples, nor is the installation place of the flute limited to a central section of a hollow body but may be provided at an inner side of an opening section; therefore a toy flute can be produced with ease and at low cost. Moreover, since a flute section provided at an inner side of an opening section of a hollow body is used as a flow passage of air, the sound of the flute is not muffled but can be heard clearly. Moreover, the sound is provided whenever the toy flute is thrown or played with. Thus, this invention has succeeded in providing a new toy flute as never before.

DETAILED DESCRIPTION OF THE INVENTION

Embodiments

Embodiment 1

Figure 1:
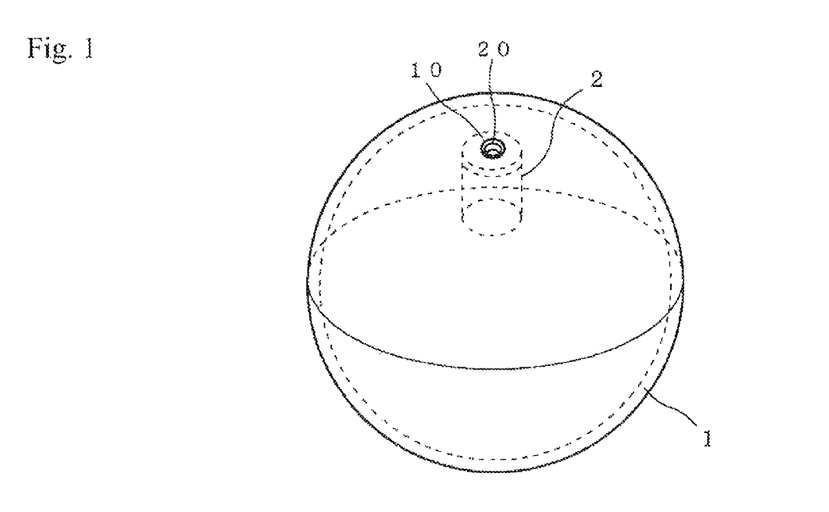
FIG. 1 is an explanatory view of Embodiment 1.
Figure 2:
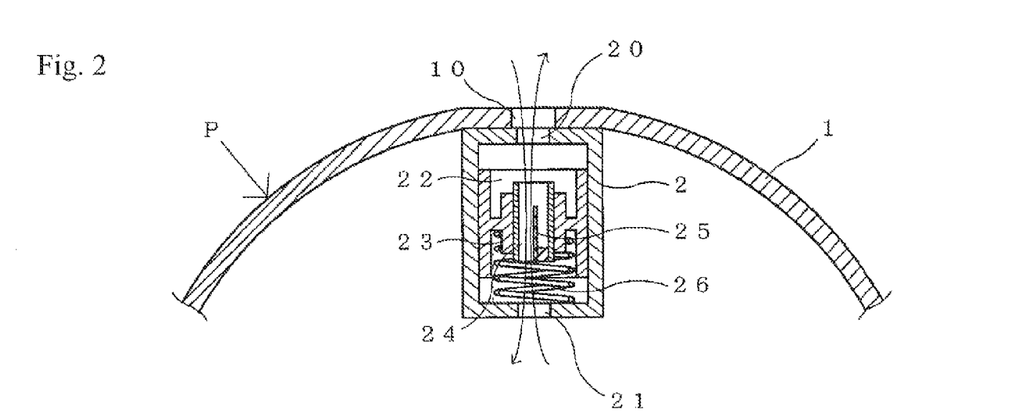
FIG. 2 is an explanatory view of the installation structure of a ball 1 and a cylindrical section 2.

A description of a ball flute according to Embodiment 1 is given below with reference to FIG. 1 and FIG. 2. A ball 1 made of a synthetic resin that is a hollow body and has elasticity and shape restoration properties is provided with one opening section 10, and a cylindrical section 2 is installed in such a manner that a vent hole 20 of the cylindrical section 2 is disposed at the abovementioned opening section 10, which is disposed at an inner side of the ball 1. As shown in FIG. 2, the cylindrical section 2 has a cylindrical shape, as a whole, having a top section and a bottom section, wherein the abovementioned vent hole 20 (the abovementioned vent hole on one side) is opened at the top section, and another vent hole 21 (the abovementioned vent hole on the other side) is opened at the bottom section on the opposite side. Inside the cylinder-shaped cylindrical section 2, a cylinder-shaped reciprocating body 22 having a cylinder-shaped support 23 inside is provided in a reciprocating manner using a coil spring 26 provided at a bottom section of the cylindrical section 2. The abovementioned support 23 is to fix a flute section 24 at its cylindrical wall face. The flute section 24 is provided with a lead 25 at a central section of the flute section 24 in such a manner as to vibrate along the longitudinal direction of the flute section in a cantilever state. In other words, the other side of the lead 25 is a free end that is vibrated to generate sound.

This ball flute has the following two sounding modes. In other words, as a first mode, the ball 1 is vibrated; as a result, the flute section 24 is vibrated together with the reciprocating body 22 inside the cylindrical section 2 with the help of the elastic force of the coil spring 26; and as the flute section 24 reciprocates, airflow occurs inside the flute section 24 to generate flute sound from the lead 25. The flute section 24 is a flute that causes sound to occur by means of airflow inside. Moreover, a sound similar to that of a croaking flute occurs because a reverberation space inside the cylindrical section 2 becomes large or small as the position of the flute section 24 changes at the inner space of the cylindrical section 2. In other words, the size of the reverberation space inside the cylindrical section 2 gives changes to the tone of the flute, wherein this principle is applied here to the present invention. As a second mode, an explosive flute sound is generated from the lead 25 inside the flute section 24 when the ball 1 is thrown and then compressed by hitting the wall or the floor or being caught by another person (see an arrow P in FIG. 2) and air inside the ball 1 goes out of the ball 1 after quickly passing through the flute section 24, the vent hole 20 and the opening section 10 of the ball 1. Moreover, since the ball 1 is so elastic that shape restoration automatically occurs, airflow is generated toward the inside of the ball 1 from the opening section 10. These two kinds of sounding modes frequently occur as a combination rather than they occurs independently. Accordingly, very complicated tones can be generated. While this ball flute is to be applied to play, it can be used for a pet as well.

In addition to the coil spring 26 on one side supporting the reciprocating body 22 (i.e., the flute section 24), another coil spring may be provided on the other side as well. In this manner, the flute section 24 is supported by both of the top and bottom coil springs in such a manner as to be sandwiched therebetween and can be moved inside the cylindrical section 2 in a reciprocating manner. The flute section 24 has subtle movement by the interaction between the top and bottom coil springs. Moreover, by making the strength, shape, quality, etc. of those two coil springs different, the reciprocating movement of the flute section 24 can be diversified. This diversification is caused by airflow that occurs inside the flute section 24 and a change in reverberation in the reverberation space, for example.

A weight may be installed at the flute section 24. Changes in the posture of the ball during rolling or throwing or at the time of holding it by hand influence the movement of the weight, which in turn influences airflow that occurs at the lead 25. The raw material of this weight may arbitrarily be selected and are generally iron, lead or the like but is not necessarily limited to those.

Embodiment 2

Figure 3:
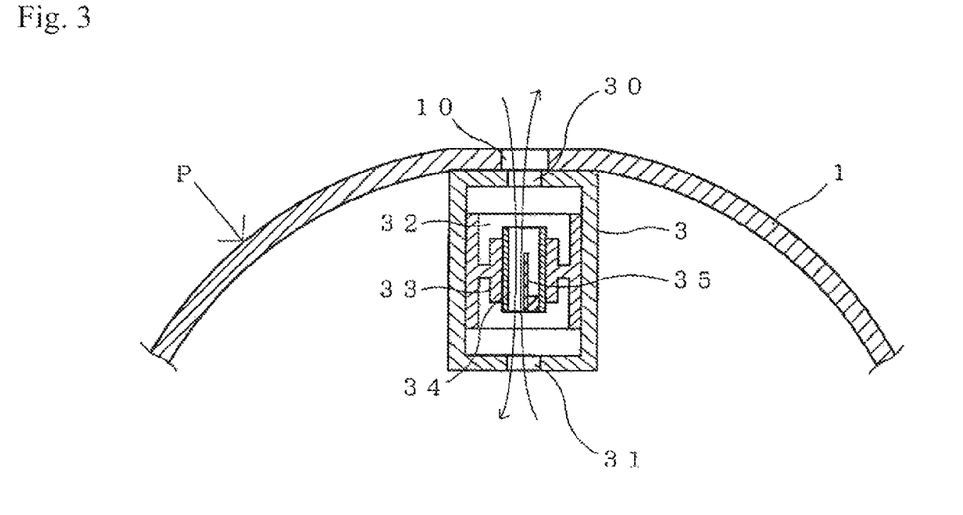
FIG. 3 is an explanatory view of the installation structure of a ball 1 and a cylindrical section 3 in Embodiment 2.

An embodiment shown in FIG. 3 is different from the abovementioned Embodiment 1 in that an elastic body such as the coil spring 26 is not provided for vibrating the flute section by elastic force. In other words, a ball 1 made of a synthetic resin and having elasticity and shape restoration properties is provided with one opening section 10, and a cylindrical section 3 is installed in such a manner that a vent hole 30 of the cylindrical section 3 is disposed at the abovementioned opening section 10, which is disposed at an inner side of the ball 1. The cylindrical section 3 has a cylindrical shape, as a whole, having a top section and a bottom section, wherein the vent hole 30 on one side is opened at the top section, and a vent hole 31 on the other side is opened at the bottom section on the opposite side. Inside the cylinder-shaped cylindrical section 3, a cylinder-shaped reciprocating body 32 having a cylinder-shaped support 33 inside is provided in a reciprocating manner. A flute section 34 is fixed inside the abovementioned support 33. The flute section 34 is provided with a lead 35 at a central section of the flute section 34 in such a manner as to vibrate along the longitudinal direction of the flute section in a cantilever state.

This ball flute has the following two sounding modes as well. In other words, as a first mode, when the ball 1 is held and shaken vertically, a flute section 34 reciprocates inside a cylindrical section 3, and as the flute section 34 reciprocates, airflow occurs inside it to thereby generate flute sound from the lead 35. A sound occurs because a reverberation space inside the cylindrical section 3 becomes large or small as the position of the flute section 34 changes at the inner space of the cylindrical section 3. In other words, the size of the reverberation space inside the cylindrical section 3 gives changes to the tone of the flute. As a second mode, an explosive flute sound is generated from the lead 35 inside the flute section 34 when the ball 1 is thrown and then compressed by force at the time of hitting the wall or the floor or being caught by another person (see an arrow P in FIG. 3) and air inside the ball 1 goes out of the ball 1 after quickly passing through the flute section 34, the vent hole 30 and the opening section 10 of the ball 1. Since the ball 1 is so elastic that shape restoration automatically occurs, airflow is generated toward the inside of the ball 3 from the opening section 30. Thus, there are two kinds of sounding modes in this embodiment, and these modes frequently occur as a combination. Accordingly, very complicated tones can be generated. While this ball flute is to be applied to play, it can be used for a pet as well.

Embodiment 3

In the abovementioned Embodiment 2, when the flute section 34 reciprocates, the cylinder-shaped reciprocating body 32 might hit the top section and bottom section of the cylindrical section 3. In this case, a hitting sound is generated depending on the material quality of the cylindrical section 3 and the reciprocating body 32. If it is undesirable, the design may be such that an elastic material such as rubber is used as the raw material of the reciprocating body 32, for example. Alternatively, this problem is avoided in Embodiment 3 in the following manner.

Figure 4:
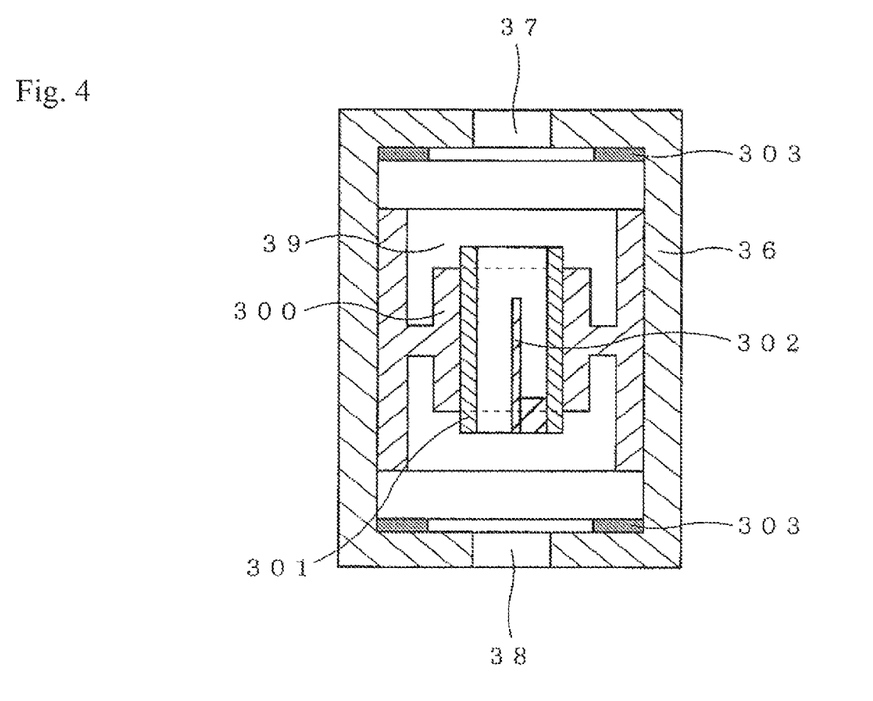
FIG. 4 is an explanatory view of a cylindrical section 36 in Embodiment 3.

In other words, as shown in FIG. 4, the cylindrical section 36 has a cylindrical shape having a top section and a bottom section, wherein a vent hole 37 on one side is opened at the top section and a vent hole 38 on the other side is opened at the bottom section, and inside the cylindrical section 36, a reciprocating body 39 having a cylinder-shaped support 300, on which a flute section 301 for making sound by means of a lead 302 is fixed, is provided in a reciprocating manner. The inner sides of the top and bottom sections of the cylindrical section 36, cushions 303 made of rubber and having central sections opened are fixed. Accordingly, even when the reciprocating body 39 reciprocates violently, it hits the cushion 303 so that its impact can be mitigated.

Embodiment 4

Figure 5:
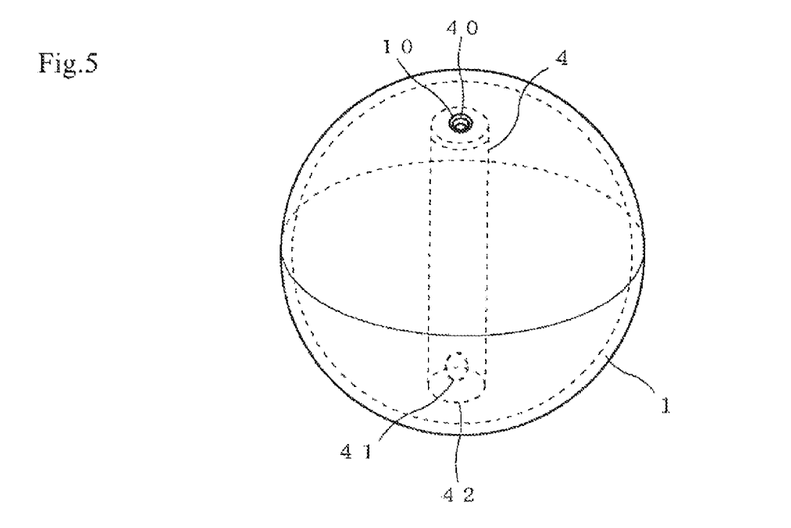
FIG. 5 is an explanatory view of the installation structure of a ball 1 and a cylindrical section 4 in Embodiment 4.

In an embodiment shown in FIG. 5, a ball 1 made of a synthetic resin and having elasticity and shape restoration properties is provided with one opening section 10, and a cylindrical section 4 is installed in such a manner that a vent hole 40 of the cylindrical section 4 is disposed at the abovementioned opening section 10, which is disposed at an inner side of the ball 1. As is shown in FIG. 5, the cylindrical section 4 has a cylindrical shape, as a whole, having a top section and a bottom section, wherein: the length between the top section and the bottom section is approximately equivalent to the inner diameter of the ball 1; the abovementioned vent hole 40 on one side is opened at the top section; and the bottom section 42 on the opposite side is fixed to the inner wall of the ball 1, and at the lateral face section of the cylindrical section 4 in the vicinity thereof, a vent hole 41 on the other side is opened. The configuration of the flute section provided at the cylindrical section 4 is approximately the same as that of the abovementioned Embodiment 1.

This embodiment is characterized in that a reverberation space inside the cylindrical section 4, which becomes large or small as the position of the flute section (not shown here) is changed, is significantly long as compared with that of Embodiment 1, so that the width of changes in tones from high tone to low tone is large; therefore a very interesting sound can be heard. Alternatively, the configuration may be such that the abovementioned bottom section 42 is not fixed to the inner wall of the ball 1.

Embodiment 5

Figure 6:
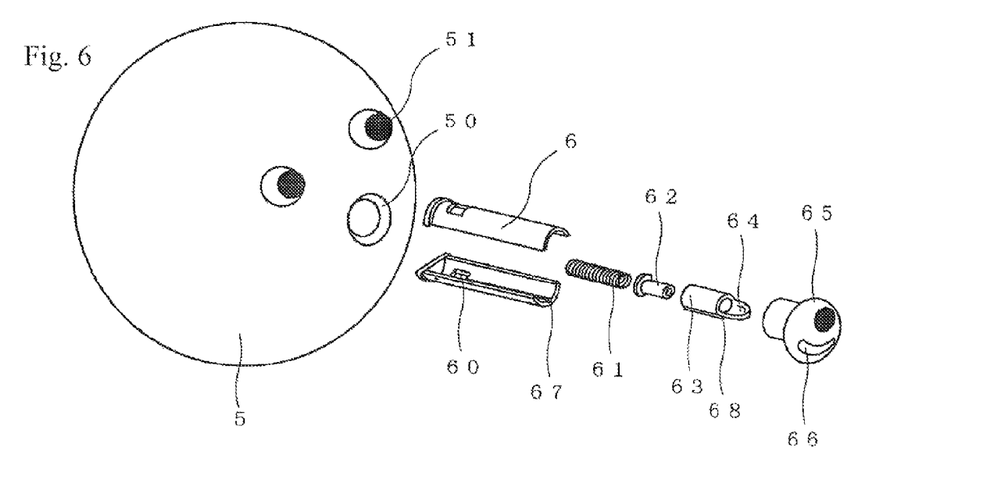
FIG. 6 is an exploded explanatory view showing a ball doll 5 and a cap 65 of a cylindrical section 6 in Embodiment 5.

An embodiment shown in FIG. 6 relates to a ball doll 5. The ball doll 5 made of a synthetic resin and having elasticity and shape restoration properties is provided with one opening section 50 and two moving eyes 51 thereabove. In this ball doll 5, a flute structure characteristic of this embodiment is installed at the abovementioned opening 50. In other words, a cylindrical section 6 to be installed at the inner side of the opening section 50 is opened at the opening section 50 side and closed on the other side, and a vent hole 60 is opened at a lateral face section in the vicinity of the other side. The cylindrical section 6 accommodates a coil spring 61 and a flute section 62, wherein the flute section 62 is covered with a holder 63 provided with a tongue-like body 64. The holder 63 corresponds to one referred to as a reciprocating body in the other embodiments. A cap 65 is fitted into the holder 63 from the outside of the opening section 50. The configuration is such that a tongue opening section 66 imitating a mouth is opened at the cap 65 (below a design of its nose) and that the tongue-like body 64 of the abovementioned holder 63 can move into or out of the tongue opening section 66. On the outer side of the holder 63, a protrusion 68 is provided in the longitudinal direction, wherein this protrusion 68 is fitted into a guide groove 67, which is provided at the inner side of the abovementioned cylindrical section 6 in the longitudinal direction in an engraved manner, so that the holder 63 cannot be rotated inside the cylindrical section 6.

As a result of the vibration of the ball doll 5, the holder 63 (i.e., the flute section 62) is vibrated inside the cylindrical section 6 by the elastic force of the coil spring 61 without rotating the holder 63 because the abovementioned protrusion 68 is fitted into the guide groove 67, and the tongue-like body 64 at the tip end of the holder 63 moves into or out of the opening section 66 of the abovementioned cap 65 without rotating as if the ball doll were chatting. Or, when the ball doll 5 is crushed by hand to be compressed, the tongue-like body 64 at the tip end of the holder 63 jumps out of the opening section 66 of the cap 65, and at a time when the shape of the ball doll 5 is restored by its elastic force, the tongue-like body 64 at the tip end of the holder 63 retreats into the opening section 66 of the cap 65. Since such movement is accompanied by sound generated by the flute section 62, people who are watching this will be attracted endlessly.

Embodiment 6

Figure 7:
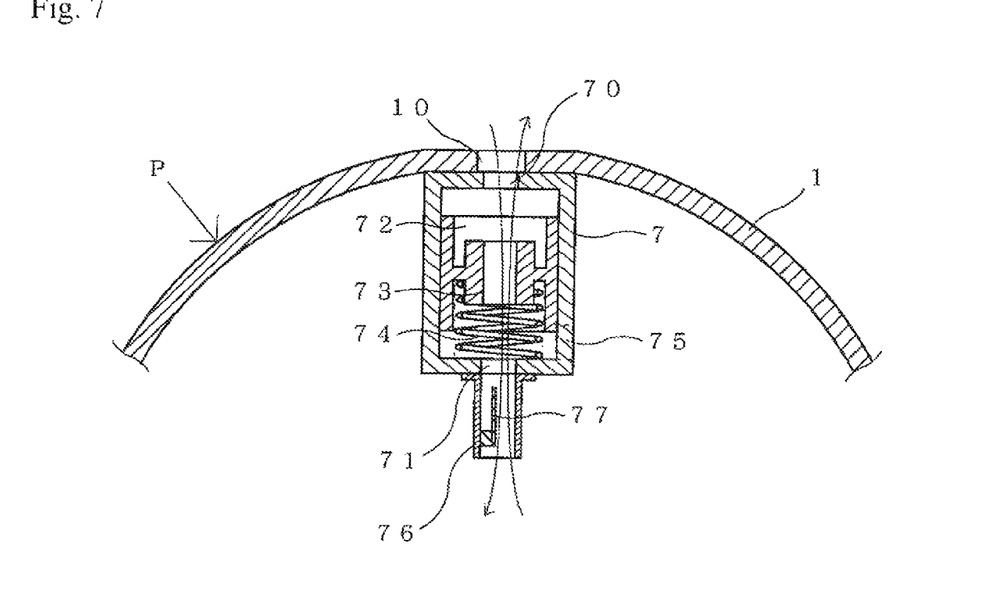
FIG. 7 is an explanatory view of the installation structure of a ball 1 and a cylindrical section 7 in Embodiment 6.

An embodiment shown in FIG. 7 is characterized in that in relation to the cylindrical section 2 of the abovementioned Embodiment 1, the reciprocating body 22 has no flute section 24 and the flute section 24 is provided outside the cylindrical section 2. In other words, a ball 1 made of a synthetic resin and having elasticity and shape restoration properties is provided with one opening section 10, and a cylindrical section 7 is installed in such a manner that a vent hole 70 of the cylindrical section 7 is disposed at the abovementioned opening section 10, which is disposed at an inner side of the ball 1. As is shown in FIG. 7, the cylindrical section 7 has a cylindrical shape, as a whole, having a top section and a bottom section, wherein the vent hole 70 on one side is opened at the top section, and a vent hole 71 on the other side is opened at the bottom section on the opposite side. Inside the cylinder-shaped cylindrical section 7, a cylinder-shaped reciprocating body 72 having a vent 73 at its central section is provided in a reciprocating manner by means of a coil spring 74 provided at a bottom section of the cylindrical section 7. At an outer side of the bottom section of the cylindrical section 7, a flute section 76 is fixed in such a manner as to be aligned with the abovementioned vent hole 71 on the other side. The flute section 76 is provided with a lead 77 at a central section of the flute section 76 in such a manner as to vibrate along the longitudinal direction of the flute section in a cantilever state. In other words, the other side of the lead 77 is a free end that is vibrated to generate sound.

The flute section 76 is a flute that causes sound to occur by means of airflow inside. A flute sound is generated from the lead 77 inside the flute section 76 when the ball 1 is thrown and then compressed by hitting the wall or the floor or being caught by another person (see an arrow P in FIG. 7) and air inside the ball 1 passes through the vent 73 of the reciprocating body 72, the vent hole 70 and the opening section 10 of the ball 1 from the vent 71 of the flute section 76 and goes out of the ball 1, wherein the reciprocating body 72 is vibrated inside the cylindrical section 7 by the elastic force of the coil spring 74 to make the reverberation space inside the cylindrical section 7 large or small, and thereby tones generated by the flute section 76 change. Moreover, since the ball 1 is so elastic that shape restoration automatically occurs, airflow is generated toward the inside of the ball 1 from the opening section 10. While the vent hole 71 is provided at a bottom section of the cylindrical section 7, the design may be such that it is provided at a lateral section of the cylindrical section 7, as shown by a chain line in FIG. 7. In this case, the flute section 76 is fixed in such a manner (not shown here) as to be aligned with a lateral vent hole 75 opened at a lateral section of the cylindrical section 7.

The following Embodiment 7 shows another embodiment in which a flute section is provided outside a cylindrical section and particularly provided at a lateral vent hole (which corresponds to a vent hole on the other side), which is opened at a lateral side of the cylindrical section.

Embodiment 7

Figure 8:
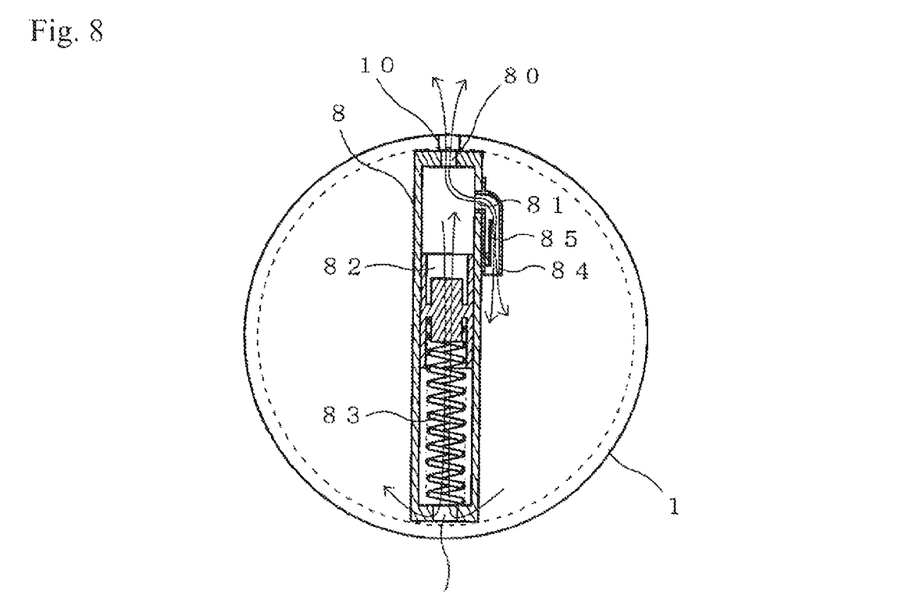
FIG. 8 is an explanatory view of the installation structure of a ball 1 and a cylindrical section 8 in Embodiment 7.

In an embodiment shown in FIG. 8, a ball 1 made of a synthetic resin that is a hollow body and has elasticity and shape restoration properties is provided with one opening section 10, and a cylindrical section 8 is installed in such a manner that a vent hole 80 of the cylindrical section 8 is disposed at the abovementioned opening section 10, which is disposed at an inner side of the ball 1. As shown in FIG. 8, the cylindrical section 8 has a cylindrical shape, as a whole, having a top section and a bottom section, wherein the length between the top section and the bottom section is approximately equivalent to the inner diameter of the ball 1, and the abovementioned vent hole 80 on one side is opened at the top section, and another vent hole 86, which is fixed at the inner wall of the ball 1 and allows air to flow into the ball 1, is opened at the bottom section on the opposite side. Inside the cylindrical section 8, a cylinder-shaped reciprocating body 82, which serves as a piston if the cylindrical section 8 is a cylinder, is provided in a reciprocating manner by means of a coil spring 83 provided at a bottom section of the cylindrical section 8. On the other hand, at a wall face between the abovementioned vent hole 80 of the cylindrical section 8 and the abovementioned reciprocating body 82, a lateral vent hole 81 (which is a vent hole on the other side) is opened, and a flute section 84 is provided there in such a manner as to be positioned outside the cylindrical section 8. The flute section 84 is provided with a lead 85 at a central section of the flute section 84 in such a manner as to vibrate along the longitudinal direction of the flute section in a cantilever state. The other side of the lead 85 is a free end that is vibrated to generate sound.

When the ball 1 is thrown and hits the wall or the floor or caught by another person, the ball 1 is compressed. Then, two airflows occur, i.e., an airflow that causes the toy flute to generate sound by vibrating the lead 85 inside the flute section 84, passes through the vent hole 80 and the opening section 10 of the ball 1 from the lateral vent hole 81 and then goes out of the ball 1 and an airflow that flows through the vent hole 86 at the bottom section of the cylindrical section 8, pushes the reciprocating body 82 upward and then goes out of the ball 1 via the vent hole 80 and the opening section 10 of the ball 1, wherein these airflows join at a reverberation space inside the cylindrical section 8 and goes out of the vent hole 80 together. Moreover, since the ball 1 is so elastic that shape restoration automatically occurs, airflow is generated toward the inside of the ball 1 from the opening section 10. Airflow that is combined up to the reverberation space inside the cylindrical section 8 is divided into two separate airflows, i.e., an airflow that vibrates the lead 85 of the flute section 84 and an airflow that pushed the reciprocating body 82 downward, but both of these airflows finally flow into the ball 1. Accordingly, the reciprocating body 82 is vibrated inside the cylindrical section 8 to make the reverberation space inside the cylindrical section 8 large or small, and thereby tones generated by the flute section 84 change. The coil spring 83 supports the reciprocating body 82 in a reciprocating manner, and its elastic force helps the reciprocating body 82 vibrate. This embodiment is characterized in that the flute section 84 provided at an outer side of the cylindrical section 8 is allowed to act on the reverberation space inside the cylindrical section 8, which becomes large or small when the reciprocating body 82 vibrates inside the cylindrical section 8. The reverberation space inside the cylindrical section 8, which becomes large or small, is significantly long as compared with that of Embodiment 1, so that the width of changes in tones from high tone to low tone is large; therefore a very interesting sound can be heard.

As in the case of the ball doll 5 in the abovementioned Embodiment 6, the configuration of the present embodiment may also be such that the ball 1 is formed into the external shape of a doll, and the reciprocating body 82 is provided with a tongue-like body, wherein the tongue-like body moves into or out of the vent hole 80. Alternatively, the design may be such that the bottom section of the cylindrical section 8 whose inner diameter is approximately equivalent to that of the ball 1 is not fixed to the inner wall. Moreover, the vent hole 86 may be opened at a lateral face section instead of the bottom section of the cylindrical section 8. The configuration may also be such that the vent hole 86 is not provided, wherein aside from playing catch, subtle sound can be generated by airflow that occurs at the flute section 84 as a result of the adjustment of gripping the ball 1 or the swinging of the body, for example, or the vibration of the reciprocating body 82 supported by the coil spring 83.

In the next embodiment (not shown here), a ball made of a synthetic resin and having elasticity and shape restoration properties as in the case of the abovementioned ball 1 in Embodiment 1 is provided with two opening sections at positions of rotatory symmetry, and a cylindrical section similar to the cylindrical section 2 in Embodiment 1 is installed at each of those opening sections. However, since they are different from each other in terms of the reverberation space and the lead of the flute section, those two cylindrical sections generate sound having different tones, wherein it is particularly interesting because it appears as if two flute sections were "competing with each other for the sound." It is also possible to provide a toy flute in which two flute sections having different tones are connected with each other in a series in such a manner that both vent holes are aligned with each other.

INDUSTRIAL FIELD OF APPLICATION

The hollow body of this invention is not limited to a ball but may freely be configured in such a manner as to be used as the hitting section of a toy hammer or as a toy bat. It is also possible to provide a toy formed by combining a bat with a ball according to an embodiment. Or, this hollow body may constitute part of a balance ball used for sports training; therefore the application of this invention is various.

EXPLANATION OF REFERENCE NUMERALS

1 Ball
2, 3, 36, 4, 6, 7, 8 Cylindrical section
22. 32. 39. 72. 82 Reciprocating body
24, 34, 301, 62, 76, 84 Flute section
26, 61, 74, 83 Coil spring
5 Ball doll
63 Holder (reciprocating body)

What is claimed is:

1. A flute toy, wherein a reciprocating body is accommodated inside a cylindrical body in a reciprocating manner; the cylindrical body is installed at an inner side of an opening provided in a hollow body in such a manner that a vent hole at one side from among two vent holes provided at the cylindrical body can communicate with the opening; and a flute is installed at the cylindrical body in such a manner that airflow flowing between the opening and a vent hole at an other side from among the two vent holes causes sound to occur and reverberates inside the cylindrical body.

2. The flute toy according to claim 1, wherein the flute is provided at the reciprocating body.

3. The flute toy according to claim 1, wherein the flute is provided so as to face the vent hole at the other side of the cylindrical body.

4. The flute toy according to claim 1, wherein: the hollow body is a doll; a tongue opening is provided at a region corresponding to a mouth of the doll; and the reciprocating body is provided with a tongue-like body.

5. A flute toy, wherein a reciprocating body is accommodated inside a cylindrical body in a reciprocating manner via an elastic body; the cylindrical body is installed at an inner side of an opening provided in a hollow body in such a manner that a vent hole at one side from among two vent holes provided at the cylindrical body can communicate with the opening; and a flute is installed at the cylindrical body in such a manner that airflow flowing between the opening and a vent hole at an other side from among the two vent holes causes sound to occur and reverberates inside the cylindrical body.

6. The flute toy according to claim 5, wherein the elastic body is a coil spring.

7. The flute toy according to claim 5, wherein the flute is provided at the reciprocating body.

8. The flute toy according to claim 5, wherein the flute is provided so as to face the vent hole at the other side of the cylindrical body.

9. The flute toy according to claim 5, wherein: the hollow body is a doll; a tongue opening is provided at a region corresponding to a mouth of the doll; and the reciprocating body is provided with a tongue-like body.

10. A flute toy comprising
a hollow body having an opening;
a cylindrical body disposed in the hollow body, the cylindrical body having first and second vent holes on its both sides and a flute disposed between the first and second vent holes; and
a reciprocating body accommodated in side of the cylindrical body so as to reciprocate within the cylindrical body;
wherein the cylindrical body is attached in the hollow body so that the first vent hole faces the opening of the hollow body, and
airflow flowing between the opening and the second vent hole causes sound and reverberates inside of the cylindrical body.

11. The flute toy according to claim 10 further comprises an elastic body disposed between the second vent hole and the reciprocating body within the cylindrical body.

12. The flute toy according to claim 11, wherein the elastic body is a coil spring.

13. The flute toy according to claim 10, wherein the flute is provided at the reciprocating body.

14. The flute toy according to claim 10, wherein the flute is provided so as to face the second vent hole.

15. The flute toy according to claim 10, wherein: the hollow body is a doll; a tongue opening is provided at a region corresponding to a mouth of the doll; and the reciprocating body is provided with a tongue-like body.

* * * * *